UNITED STATES PATENT OFFICE.

PARMER R. CROSS, OF LOWELL, INDIANA.

IMPROVED WASHING-FLUID.

Specification forming part of Letters Patent No. 40,914, dated December 15, 1863.

*To all whom it may concern:*

Be it known that I, PARMER R. CROSS, of Lowell, in the county of Lake and State of Indiana, have invented a new and useful Improvement in Washing-Fluid called the "Indiana Washing-Fluid;" and I do hereby declare that the following is a full, clear, and exact description thereof.

The nature of my invention consists in compounding in certain proportions and in a specified manner the several ingredients hereinafter specifically described; and my object is to produce thereby a fluid compound to be used for washing purposes which shall render the labor, time, and expense of washing much less than is required by the use of any other washing-fluid, and which shall not rot or otherwise injure the clothes.

To enable those skilled in the art to understand fully how to compound and make use of my Indiana washing-fluid, I will proceed to describe my invention with particularity.

To make one quart of my improved washing-fluid I compound the following ingredients in the proportions specified: three and a half ounces of washing-soda, four drams of borax, and four drams of saltpeter; one-fourth of a gill of ninety per cent. alcohol, two drams of camphor-gum, two drops of spirits of hartshorn, four drops of oil of tansy, and two drops of oil of cedar. To the above enough rainwater is added to make a quart of the whole, including the above-described ingredients.

The washing-fluid is prepared in the following manner: The water is first heated to 160° Fahrenheit, when the soda, borax, and saltpeter are added, and a sufficient time allowed for the same to dissolve. The gum-camphor and hartshorn are then put into the alcohol and allowed to dissolve, when the oil of cedar and oil of tansy are added, and the whole compounded together and thoroughly shaken and mixed. When the fluid has become cold it is ready for use, and should be kept corked or sealed tightly to prevent evaporation.

To make use of my Indiana washing-fluid mix four table-spoonfuls of the fluid with a pint of soft soap or half a pound of melted bar-soap, which is sufficient to do the washing for a family of four or five persons. Then make warm suds with one-half of the prepared soap, in which the clothes should be soaked for about thirty minutes, and if the clothes should be very much soiled they should be rubbed slightly and then wrung out. Then clean water is put in a suitable boiler and placed over the fire, and the remainder of the prepared soap is then put into the water, and when it has become warm the clothes treated as above described are put in and allowed to boil about five minutes, when they are rinsed out in two waters, and the washing is done.

This fluid is particularly adapted to washing woolens, as they are more thoroughly cleansed and less liable to shrink than when washed in the ordinary way. The mixture may also be used for washing the wood-work, ceiling, and floors of rooms, and for any purpose will save from one-third to one-half of the labor, time, and expense of washing.

Having described the nature and mode of using my improved washing-fluid, I will state what I claim as my invention and desire to secure by Letters Patent.

The washing-fluid composed of the herein-described ingredients, in the proportions specified, substantially as and for the purposes set forth and described.

PARMER R. CROSS.

Witnesses:
RYLAND D. SHERMAN,
JAMES N. ORR.